United States Patent [19]

Karol

[11] 4,310,218
[45] Jan. 12, 1982

[54] PIN AND SOCKET TERMINALS FOR FIBER OPTIC CABLES

[75] Inventor: James J. Karol, Unadilla, N.Y.

[73] Assignee: The Bendix Corporation, Southfield, Mich.

[21] Appl. No.: 71,640

[22] Filed: Aug. 31, 1979

[51] Int. Cl.³ .............................................. G02B 5/14
[52] U.S. Cl. .................................................. 350/96.21
[58] Field of Search ........................... 350/96.21, 96.22

[56] References Cited

U.S. PATENT DOCUMENTS

| | | | |
|---|---|---|---|
| 3,885,859 | 5/1975 | Dalgleish et al. | 350/96.21 |
| 4,008,948 | 2/1977 | Dalgleish et al. | 350/96.21 |
| 4,088,386 | 5/1978 | Hawk | 350/96.21 |
| 4,105,285 | 8/1978 | Bedgood et al. | 350/96.21 |
| 4,178,068 | 12/1979 | Hoover | 350/96.22 |
| 4,217,031 | 8/1980 | Mignien et al. | 350/96.21 |
| 4,218,113 | 8/1980 | Uberbacher | 350/96.21 |

FOREIGN PATENT DOCUMENTS

| | | | |
|---|---|---|---|
| 2529352 | 1/1976 | Fed. Rep. of Germany | 350/96.21 |
| 2636997 | 2/1978 | Fed. Rep. of Germany | 350/96.21 |
| 2389148 | 12/1978 | France | 350/96.21 |

*Primary Examiner*—Stewart J. Levy
*Attorney, Agent, or Firm*—Paul J. Ethington; Raymond J. Eifler; Charles D. Lacina

[57] ABSTRACT

A pin terminal (12) and a socket terminal (62) for coupling the free ends of a pair of optical fibers is disclosed. The terminals (12,62) are adapted for mounting in respective connector members (10,18) of the multiple terminal type. The pin terminal (12) has an optical fiber cable (14) secured at the rearward end with the fiber (50) extending partially through a channel (32). The socket terminal (62) has a cable (16) secured at its rearward end with the free end of the fiber (52) extending partially through the socket terminal. When the pin terminal is telescopically inserted into the socket terminal, the fiber (52) enters the channel (32) which includes self-aligning means for the fibers.

7 Claims, 9 Drawing Figures

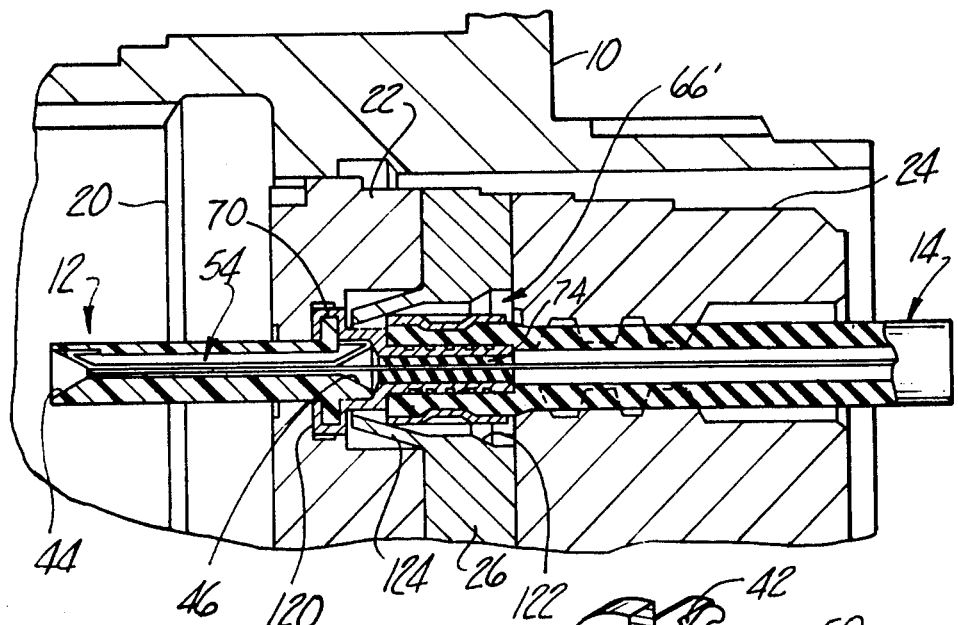
Fig-1
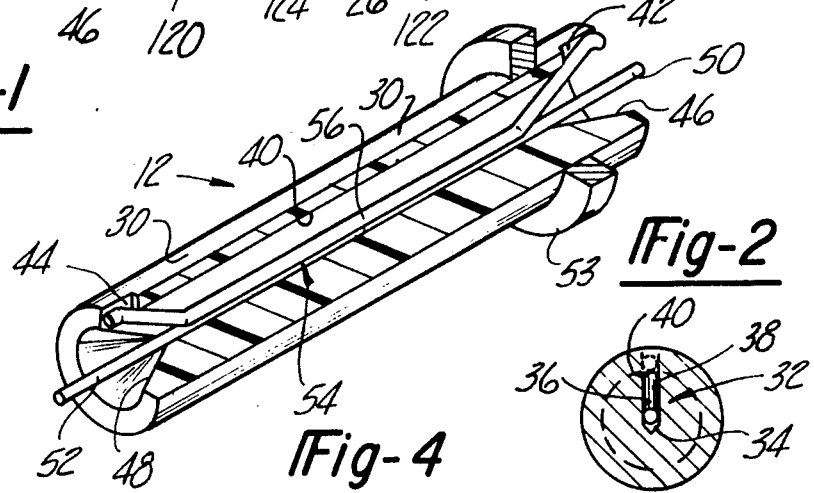
Fig-2
Fig-4
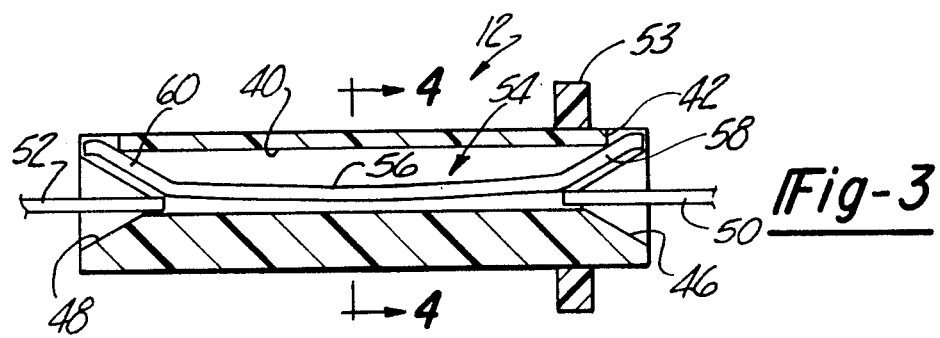
Fig-3

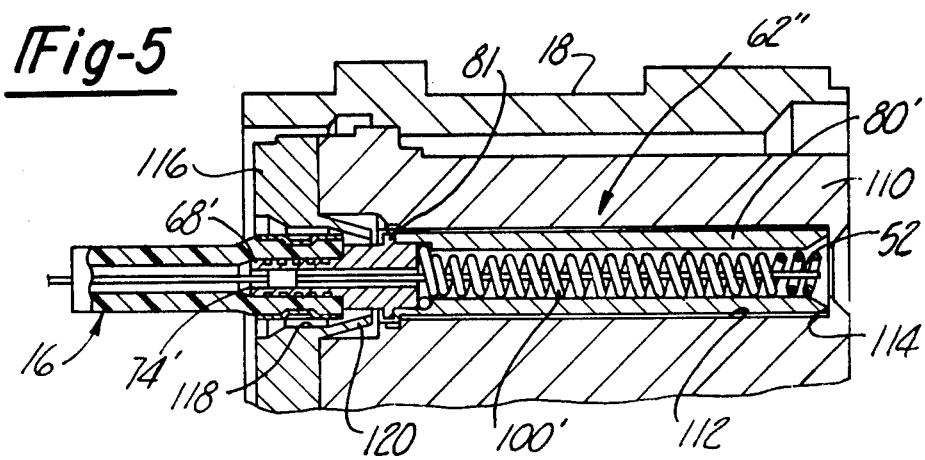
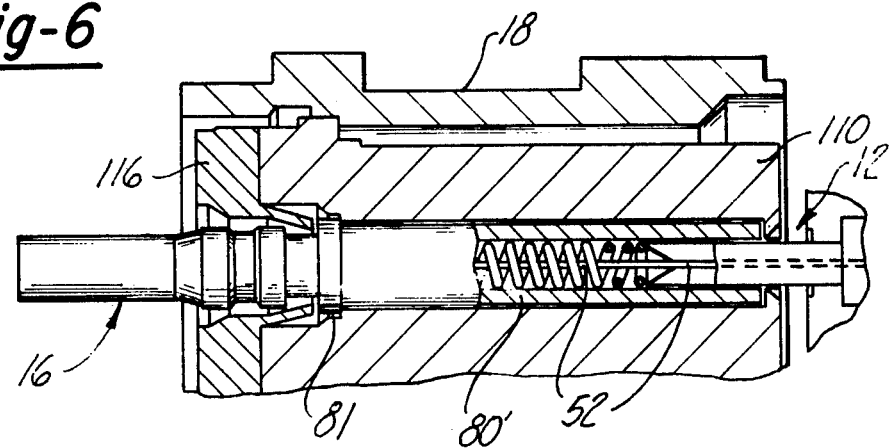
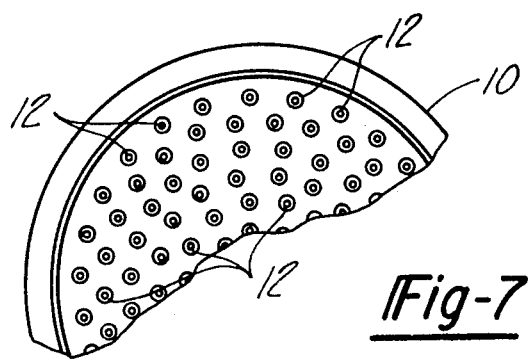

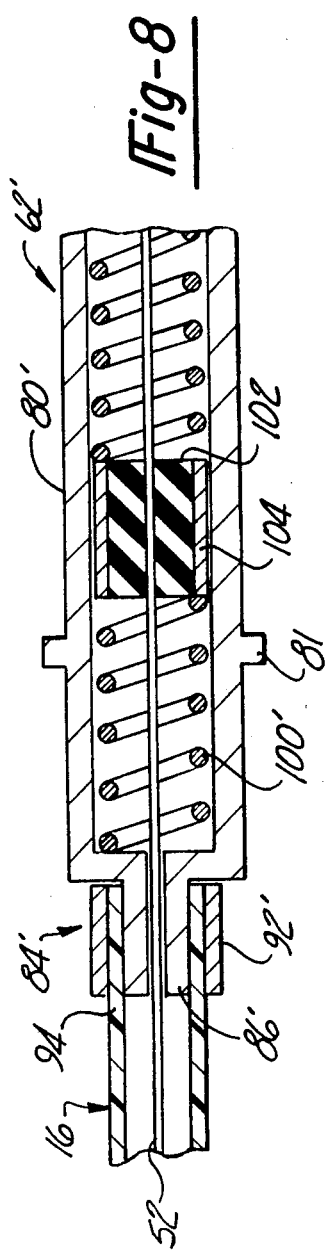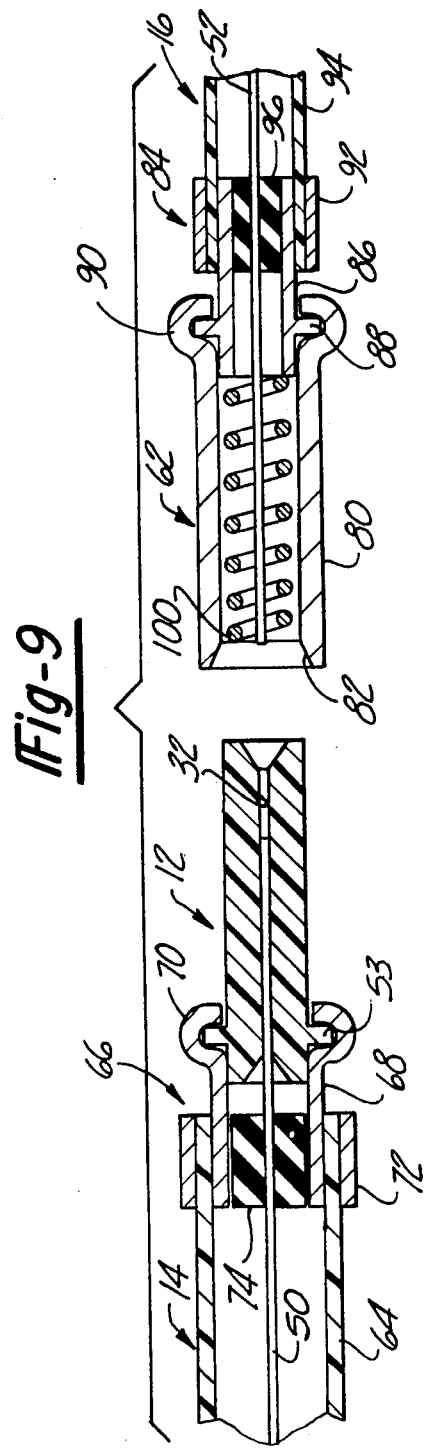

PIN AND SOCKET TERMINALS FOR FIBER OPTIC CABLES

TECHNICAL FIELD

This invention relates to connectors for fiber optic cables; more particularly, it relates to mating terminals for optical fibers.

BACKGROUND OF THE INVENTION

In optical systems using fiber optics for transmitting signals by light energy, it is often necessary to couple two fibers end-to-end for the signal transmission path. The optical fibers are of very small diameter and are of fragile construction. Typically, a fiber optic cable comprises an optical fiber covered by a jacket of plastic material for protecting the fiber from damage due to handling during installation and exposure in its operating environment. A typical single filament cable comprises a glass fiber having a diameter of a few thousands of an inch and a protective jacket having a diameter a few hundreds of an inch. In order to facilitate repeated connection and disconnection of one or more pairs of fibers it is desirable to utilize separable connectors having single or multiple terminal pairs, such as the connectors commonly used in the electronic industry.

A connector for optical fiber cables must provide for accurate alignment of the pairs of fibers being joined and provide support for the cable jacket in order to relieve the fiber itself from stress. The connector must be provided with terminals for the pairs of fibers being joined which are capable of repeated connection and disconnection and which are of simple and low cost construction.

In the prior art, connectors for fiber optic cables have been disclosed which utilize pin and socket type terminals. Such an arrangement is described in U.S. Pat. No. 4,140,366 granted to Makuch et al. In the connector of this patent, each fiber or bundle of fibers is provided with a special termination which has an end flush with the end of the fiber or fiber bundle. The termination for one fiber or fiber bundle is disposed within a socket on one connector member and the termination for the other fiber or fiber bundle is disposed within a tubular pin which is mated with the socket to juxtapose the terminations end-to-end.

The prior art also discloses single filament optical fiber cables coupled in end-to-end relationship by attaching a ferrule to the end of the single fiber and mechanically aligning and connecting the ferrules together. Typically, the fiber is encased in the ferrule so that the end of the fiber is flush with the end of the ferrule. Two fibers are coupled by placing the respective ferrules in end-to-end abutting relationship. This type of connector is disclosed in U.S. Pat. No. 4,087,158 granted to Lewis et al. and U.S. Pat. No. 4,090,778 granted to Phillips et al.

Also, in the prior art, attempts have been made to provide a fiber optic cable connector in which the fibers are aligned by matching terminations each of which supports a respective cable with the free end of the fiber extending therefrom. In connectors of this type, the free ends of the corresponding pairs of optical fibers are disposed in a V-groove on one of the terminations and a holding means on the other termination bears against the fibers to hold them in alignment in the V-groove. This kind of arrangement is disclosed in U.S. Pat. No. 3,885,859 granted to Dalgleish et al. and in U.S. Pat. No. 4,088,386 granted to Hawk.

A general object of this invention is to provide a fiber optic cable connector of the pin and socket type which overcomes certain disadvantages of the prior art.

DISCLOSURE OF THE INVENTION

In accordance with this invention, mateable pin and socket terminals are provided for coupling the free ends of a pair of optical fiber cables, the terminals being especially adapted for use in a separable connector of the single or multiple terminal type. The pin terminal comprises an axial channel having a forward and a rearward end with means for securing a first optical fiber cable thereto at the rearward end thereof with the free end of the first optical fiber extending partially through the channel. A socket terminal according to one embodiment of this invention has means for securing the second optical fiber cable thereto at the rearward end thereof with the free end of the second optical fiber extending partially through the socket terminal. The socket terminal is adapted to receive the pin terminal in telescopic relation wherein the free end of the second optical fiber enters the channel in the pin terminal when the pin terminal is inserted into the socket terminal. The socket terminal includes means for holding the free end of the second optical fiber near the central axis of the socket to insure entry of the second optical fiber into the channel, such holding means preferably comprising a helical spring within the socket. The pin terminal is provided with means for self-alignment of the fibers within the channel. The means for securing the fiber to either the pin terminal or the socket terminal comprises coaxial inner and outer sleeves for receiving the cable jacket therebetween and an elastomeric grommet in the inner sleeve so that crimping of the sleeves against the grommet retains the fiber and the jacket of the cable. In an alternative construction, a body, preferably an elastomeric body is secured to the fiber and is disposed within the socket terminal to retain the fiber in the socket terminal.

A more complete understanding of this invention may be obtained from the detailed description that follows with the accompanying drawings.

DESCRIPTION OF THE DRAWINGS

FIG. 1 shows the invention embodied in a pin terminal for fiber optic cables, the pin terminal being mounted in a connector, FIG. 2 shows a perspective view partially in section of detail of the pin terminal shown in FIG. 1, FIG. 3 shows a sectional view of the pin terminal shown in FIG. 2, FIG. 4 shows a view taken on lines 4—4 of FIG. 3, FIG. 5 shows a socket terminal in a connector according to this invention, FIG. 6 shows the pin and socket in mated condition.

FIG. 7 is a view of a connector having multiple terminals,

FIG. 8 shows an alternate construction, of a socket terminal according to this invnetion and FIG. 9 shows yet further embodiments of a pin and socket terminals in opposed relationship.

BEST MODE FOR CARRYING OUT THE INVENTION

Referring now to the drawings, there is shown an illustrative embodiment of the invention in an optical fiber cable connector of the separable type having multiple pairs of terminals. It will be appreciated, as the description proceeds, that the invention is useful in many different applications.

FIG. 1 is a fragmentary view of a separable connector which is adapted for connecting multiple pairs of optical fiber cables. The connector, except for the pin and socket terminals is suitably of the same type and structure as multiple terminal cable connectors used in the electronic circuits. A connector member or shell 10 of cylindrical structure supports multiple pin terminals 12 for coupling an optical fiber cable 14 to a corresponding cable 16 in a mating connector member or shell 18 (see FIG. 5). As shown in FIG. 1, the pin terminal 12 is supported in the connector shell 10 by an assembly including an interfacial seal 20 and a pair of inserts 22 and 24 having a terminal retention member 26 therebetween. The support for the pin terminal 12 and the optical fiber cable 14 will be described in greater detail subsequently.

The pin terminal 12 is shown in detail in FIGS. 2, 3 and 4. The pin terminal is adapted to receive the free ends of a pair of optical fibers 50 and 52 which are inserted into the pin in abutting end-to-end relationship in accurate alignment with each other. The pin 12 comprises an elongated body 30 of circular cross-section and is preferably constructed of molded plastic. The pin 12 defines an axially extending channel 32 which extends from end-to-end of the pin. The channel 32 includes a V-shaped bottom wall or V-groove 34 which is substantially coaxial of the pin. The channel 32 has a pair of spaced, parallel sidewalls 36 and 38 extending from the V-groove bottom wall 34 to a top wall 40. An opening 42 is provided in the top wall 40 at the rearward end of the body 30 and a recess 44 is provided in the forward end of the body for purposes which will be described subsequently. The body is provided with a tapered opening 46 at the rearward end of the pin terminal and a tapered opening 48 at the forward end, such openings constituting entrances to the channel 32 to facilitate insertion of an optical fiber at each end. The body 30 of the pin terminal 12 is provided with an annular flange or shoulder 53 for mounting purposes, as will be described subsequently.

The channel 32 in the body 30 is adapted to receive the pair of optical fibers 50 and 52 in abutting end-to-end relationship. The fibers are adaped to be placed in axial alignment with each other in the V-groove 34 of the channel. In order to guide and maintain the fibers into alignment and in seating engagement with the V-groove, holding means in the form of a spring wire 54 is disposed within the channel 32. The spring wire 54 is provided with a central section 56 which, as shown in FIG. 2 is substantially straight and extends axially of the channel with the fibers 50 and 52 in place. The central section 56, in its free state as shown in FIG. 3 is slightly arcuate and occupies a part of a channel in which the fibers 50 and 52 are to be inserted. The spring wire 54 is also provided with an obliquely extending end section 58 and an obliquely end section 60, both end sections lying in the same plane. The spring wire 54 is suitably installed in the body 30 of the pin terminal by inserting the end section 58 from the forward end of the pin terminal and allowing it to flex as required to assume the position as shown in FIG. 3.

When the optical fiber 50 of the cable 14 is inserted into the rearward end of the pin terminal 12, as depicted in FIG. 3, the end of the fiber is guided by the tapered recess 46 into the channel 32. Upon entrance of the fiber into the channel, it engages the arcuate surface of the spring wire 54 near the juncture of the end section 58 and central section 56 thereof. This engagement, imposes a slight resisting force to the insertion of the fiber and the spring wire is deflected out of the way of the fiber but it exerts a lateral force thereon which seats the fiber in the V-groove 34. The fiber 50 is inserted partially through the pin terminal 12 to approximately the mid-point, and the fiber is secured to the pin in a manner which will be described subsequently. The pin terminal 12 is adapted to receive the other optical fiber 52 by endwise insertion at the front end of the pin terminal. The fiber 52 is inserted in the same manner as described with reference to fiber 50 to a point at which it is in abutment with the end of the fiber 50. The fibers 50 and 52 are thus positively seated in the V-groove 34 under the influence of spring wire 54 and are thus held in accurate axial alignment with each other. Any excessive motion of the optical fiber 52 upon insertion into the channel 32 will be taken up by slight buckling of the fiber 52 or fiber 50 at a point outside the confines of the body 30.

As illustrated in FIG. 9, the pin terminal 12 is adapted to coact with a socket terminal 62. Before proceeding with the description of the socket terminal 62, the mounting of the pin terminal on the optical fiber cable 14 will be described. The cable 14 comprises the optical fiber 50 and a protective jacket 64 of plastic material. For installing the pin terminal 12, the jacket 14 is stripped from a free end portion of the fiber 50. A fitting 66 is adapted to connect the terminal pin 12 to the cable 14 and secure the fiber 50 in fixed relation to the pin terminal and to secure the jacket 64 to provide strain relief for the fiber. The fitting 66 comprises an inner sleeve 68 of metal which is mounted on the body 30 by a rolled flange 70 which engages the annular shoulder 53 on the body. The fitting 66 also comprises an outer sleeve 72 of metal which is disposed coaxially of the inner sleeve 68 with an annular space therebetween to receive the end of the jacket 64. An elastomeric body or grommet 74 is disposed within the inner sleeve 68 to restrain movement of the optical fiber 50 relative to the pin 12. As shown in FIG. 9, the grommet 74 has a passage therethrough to receive the fiber 50. It will be understood that the fiber 50 is sufficiently flexible that it could be laid along side the grommet 74 to achieve the same purpose. With the fitting 66 in place, as illustrated in FIG. 9, the outer sleeve 72 is crimped radially against the inner sleeve 68 which is crimped inwardly against the grommet 74 so that the fiber 50 and the jacket 64 are firmly gripped by the fitting. The fitting is shown before crimping in FIG. 9 and is shown after crimping as fitting 66' in FIG. 1.

Referring further to FIG. 9, the socket terminal 62 is disposed in mating alignment with the pin terminal 12. The socket terminal 62 comprises a sleeve 80 of metal having an inside diameter which receives the pin 12 in telescopic relation with a clearance fit. The sleeve is suitably provided at its forward end with a tapered recess 82 for facilitating entry of the pin terminal 12. The socket terminal 62 is adapted to be mounted on the end of the optical fiber cable 16 by a fitting 84. The fitting 84 comprises an inner sleeve 86 having an external annular flange or shoulder 88. The sleeve 80 of the socket 62 is mounted on the inner sleeve 86 by a rolled flange 90 which engages the shoulder 88. The fitting 84 also includes an outer sleeve 92 which is disposed coaxially of the inner sleeve 86 with an annular space therebetween for receiving the end of the jacket 94 of the cable 16. An elastomeric body or grommet 96 is disposed within the inner sleeve 86 and is adapted to secure the optical fiber 52 in a fixed relation with the socket terminal 62 in the manner described above with reference to grommet 74. The outer sleeve 92 and inner sleeve 86 are crimped radially so that the grommet 96 is deformed and the optical fiber 52 and the jacket 94 are securely gripped by the fitting.

The free end of the optical fiber 52 extends partially through the sleeve 80 of the socket terminal 62. Because of the flexibility of the optical fiber, it tends to droop at the free end. In order to provide support for the end of the fiber, a coil spring 100 is disposed within the sleeve 80 in surrounding relationship to the optical fiber. When the spring 100 is in its free state or extended as shown in FIG. 9, the free end of the optical fiber 52 is held thereby near the central axis of the socket terminal 62.

As shown in FIG. 9, when the pin terminal 12 is inserted into the socket terminal 62, the free end of the optical fiber 52 in the socket terminal will enter the channel 32 in the pin terminal. The spring 100 will be compressed by the pin toward the rear of the socket and the end of the optical fiber 50 will abut the end of the optical fiber 98. The length of the optical fibers is such that the ends will reach abutting engagement before the pin is bottomed out in the socket. In the event that abutment of the fibers occurs before the pin is fully inserted the fibers will take up the excess motion by a harmless buckling in the area where the fibers are unsupported. With the pin and socket terminal in the mated condition as described, the optical fibers 50 and 52 are held in alignment by the alignment means described with reference to FIGS. 2, 3 and 4.

An alternate embodiment of the socket terminal is illustrated in FIG. 8. In this embodiment the socket terminal comprises a cylindrical sleeve 80' having an annular mounting shoulder 81. The socket terminal 62 is mounted on the optical fiber cable 16 by a fitting 84' similar to the fitting 84 of FIG. 9. The fitting 84' comprises an inner sleeve 86' which is formed integrally with the sleeve 80'. An outer sleeve 92' is disposed coaxially of the inner sleeve 86' with annular space therebetween to receive the jacket 94 of the cable 16. The optical fiber 52 extends through the inner sleeve 86' and an elastomeric body 102 is secured thereto within the sleeve 80'. A metal sleeve 104 around the elastomeric body 102 is crimped inwardly to compress the sleeve against the fiber 52 so that the body is fixedly attached. A coil spring 100' is disposed within the sleeve 80' in surrounding relationship with the fiber 52 and with two adjacent coils spanning the elastomeric body 102. In this embodiment, insertion of the pin terminal 12 into the socket 62' will compress the spring 100' and the ends of the fibers will reach an abutting condition. Any excess motion of the pin terminal will cause the fibers to buckle as described above. This buckling of the fiber 52 will be assisted by the force of the pin terminal being asserted against the elastomeric body 102. This is especially desirable in connection with relatively stiff optical fibers, such as those of larger size.

FIG. 5 illustrates a socket terminal 62" installed in a connector member 18. The socket terminal 62" is substantially the same as terminal 62' of FIG. 8 except that the elastomeric body 102 is not used. Instead, fiber 52 is held fast to the socket terminal by an elastomeric body 74' within the sleeve 68', as described with reference to FIG. 9. Other parts of the socket terminal 62" are substantially the same as corresponding parts in the terminal 62' of FIG. 8 and the same reference characters are used. The socket terminal 62" is mounted in the connector sleeve 18 by an insert 110 which is contained within the sleeve 18. The socket terminal 62" is fitted within an axial bore 112 in the insert 110 and the forward end of the socket terminal 62" is seated against a shoulder 114 at the forward end of the insert. The socket terminal 62" is retained in the bore 112 by a retention member 116 contained within the sleeve 18 against the rearward end of the insert 110. The retention member 116 is provided with an opening 118 through which the socket terminal 62" extends. The opening 118 is surrounded by a plurality of retention fingers 120 which are disposed behind the mounting shoulder 81 on the socket terminal 62" and hold it in place in the insert 110.

The pin terminal 12 is mounted in the connector sleeve 10 in a manner similar to that just described for the sleeve terminal 62". Reverting back to FIG. 1, the pin terminal 12 mounted in the inserts 22, 24 and in the retention member 26 which are contained within the connector sleeve 10. It is noted that the pin terminal 12 is of substantially the same construction as that described with reference to FIGS. 2, 3, 4, 5 and 9 and the parts thereof are designated by the same reference characters. The pin terminal 12 extends through a bore in the insert 22 and the mounting shoulder 70 of the pin terminal is seated against a shoulder 120 on the insert 22. The forward end of the terminal pin 12 extends through the interfacial seal 20 for engagement with a corresponding socket terminal. The pin terminal 12 is held in place by the retention member 26 which has an opening 122 surrounded by plural retention fingers 124. The retention fingers 124 are disposed behind the mounting shoulder 90 and hold the pin terminal 12 in position in the insert 22. The cable 14 extends from the rearward end of the pin terminal 12 through the insert 24.

As shown in the fragmentary view of FIG. 7, the connector member or sleeve 10 includes multiple pin terminal 12. Similarly, the connector member 18 includes multiple socket terminal 62" each of which corresponds with one of the pin terminal 12. Accordingly, when the connector members 10 and 18 are placed in mating engagement, each pin terminal 12 enters a corresponding socket terminal 62". This relationship is illustrated in FIG. 6. It is noted that the pair of optical fibers 50 and 52 are brought into accurate axial alignment by the alignment means in the pin terminal when the pin terminal enters the socket terminal. The separable connector members 10 and 18 may be repeatedly connected and disconnected and the corresponding pin and socket terminal will be reconnected each time with self-alignment of the optical fibers.

Although the description of this invention has been given with reference to a particular embodiment, it is not to be construed in a limiting sense. Many variations and modifications will now occur to those skilled in the art. For a definition of the invention, reference is made to the appended claims.

What is claimed is:

1. A mateable pair of terminals for optically coupling first and second optical fiber cables, comprising:
   a pin terminal having an axial channel extending from a rearward end to a forward end of the pin terminal;
   means for securing the first optical fiber cable at the rearward end of the pin terminal so that a free end portion of the fiber extends partially through the channel, said channel being adapted to receive the second optical fiber cable removably extending into the forward end thereof;

a socket terminal having a forward end adapted to receive said pin terminal in telescopic relation;

means for securing the second optical fiber cable at the rearward end of the socket terminal so that a free end portion of the second optical fiber is exposed and extends partially through the forward end of said socket terminal; and a coil spring having an engageable end extending into the forward end of the socket for aligning the free end portion of the second optical fiber with the central axis of the socket, said coil spring engageable end being adjacent the free end of the second optical fiber and being retractable by engagement with said pin terminal, whereby when the pin terminal is matingly engaged with said socket terminal, the free end portion of the second optical fiber enters the channel and the ends of the fibers are aligned and optically coupled.

2. A socket terminal for an optical fiber cable comprising:

a cylindrical sleeve having a forward end portion adapted to slideably receive a pin terminal in telescopic relation;

means for securing a portion of the optical fiber cable to the rearward end of said sleeve so that the free end of the optical fiber cable extends partially through said sleeve; and a coil spring having an engageable end extending into the forward end of the sleeve for aligning the free end of the optical fiber cable with the central axis of the sleeve, said coil spring engageable end being adjacent the free end of the fiber and being retractable by engagement with said pin terminal, said pin terminal mounting the free end of a second fiber optic cable for coupling with the first said optical fiber cable.

3. An invention as defined in claim 2 wherein said coil spring is disposed coaxially of said sleeve.

4. The invention as defined in claim 3 wherein said means for securing comprises an inner sleeve mounted on the rearward end of the first mentioned sleeve, an elastomeric body in one of said sleeves and being adapted to be secured to said fiber, and an outer sleeve disposed over said inner sleeve and adapted to receive the jacket of said cable between the outer sleeve and the inner sleeve whereby the outer sleeve may be crimped on the inner sleeve to hold the jacket in fixed relation to the first mentioned sleeve.

5. The invention as defined in claim 4 wherein said elastomeric body is disposed within said inner sleeve for securing said fiber to said inner sleeve.

6. The invention as defined in claim 4 wherein said elastomeric body is disposed within the first mentioned sleeve and is adapted to be secured to said fiber.

7. The invention as defined in claim 2 wherein said sleeve includes an external annular shoulder for mounting the socket terminals.

* * * * *